(12) United States Patent
Imiolczyk et al.

(10) Patent No.: US 11,732,621 B2
(45) Date of Patent: Aug. 22, 2023

(54) MULTI-VALVE (71) Applicant: Dr. Ing. h.c. F. Porsche Aktiengesellschaft, Stuttgart (DE)

(72) Inventors: Marius Imiolczyk, Tamm (DE); Harald Raiser, Balingen (DE); Stephan Machate, Hainfeld (DE); Alexander Seibel, Fellbach (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 17/720,332

(22) Filed: Apr. 14, 2022

(65) Prior Publication Data
US 2022/0341350 A1 Oct. 27, 2022

(30) Foreign Application Priority Data

Apr. 21, 2021 (DE) ...................... 10 2021 110 106.9

(51) Int. Cl.
*F01L 3/12* (2006.01)
*F01L 3/20* (2006.01)
*F16K 11/085* (2006.01)
*F01L 3/00* (2006.01)

(52) U.S. Cl.
CPC ................... *F01L 3/12* (2013.01); *F01L 3/20* (2013.01); *F16K 11/0856* (2013.01); *F01L 2003/251* (2013.01)

(58) Field of Classification Search
CPC ............ F01L 3/12; F01L 3/20; F16K 11/0856
See application file for complete search history.

(56) References Cited

U.S. PATENT DOCUMENTS

| 5,927,330 A | 7/1999 | Minton et al. | |
|---|---|---|---|
| 2003/0098077 A1* | 5/2003 | McLane | F16K 11/0856 137/625.47 |
| 2015/0101693 A1* | 4/2015 | Enomoto | F16K 31/535 137/597 |

(Continued)

FOREIGN PATENT DOCUMENTS

| CN | 111828687 A | 10/2020 |
|---|---|---|
| DE | 19507919 A1 | 9/1996 |

(Continued)

*Primary Examiner* — Long T Tran
(74) *Attorney, Agent, or Firm* — Leydig, Voit & Mayer, Ltd.

(57) ABSTRACT

A multi-valve for a cooling system of a motor vehicle includes: a valve housing, which has a plurality of inlets and a plurality of outlets and delimits a cylindrical valve chamber, the plurality of inlets and the plurality of outlets opening into the cylindrical valve chamber; and a valve unit, which is arranged inside the cylindrical valve chamber of the valve housing and is rotatable about an axis of rotation between a plurality of switching positions by an actuator. Depending on a switching position of the valve unit, different inlets of the plurality of inlets are fluidically connectable to different outlets of the plurality of outlets. The valve unit has a plurality of fluid channel structures which are offset from one another in a circumferential direction. Each switching position of the plurality of switching positions is respectively assigned a fluid channel structure of the plurality of fluid channel structures.

18 Claims, 5 Drawing Sheets

(56) References Cited

U.S. PATENT DOCUMENTS

| | | | | |
|---|---|---|---|---|
| 2015/0176470 A1* | 6/2015 | Lee | ............................ | F01P 7/14 |
| | | | | 123/41.29 |
| 2015/0241884 A1* | 8/2015 | Carns | .................... | F16K 31/002 |
| | | | | 251/248 |
| 2016/0123218 A1* | 5/2016 | Lee | ......................... | F01P 7/165 |
| | | | | 123/41.08 |
| 2016/0167481 A1* | 6/2016 | Makihara | ............ | B60H 1/00485 |
| | | | | 237/5 |
| 2019/0195119 A1* | 6/2019 | Sato | ........................... | F01P 7/14 |
| 2021/0131575 A1 | 5/2021 | Bunda et al. | | |
| 2021/0381607 A1* | 12/2021 | Koch | .................... | F16K 11/076 |

FOREIGN PATENT DOCUMENTS

| | | |
|---|---|---|
| DE | 102015000424 B3 | 4/2016 |
| EP | 3384187 | 10/2018 |
| JP | 2013238310 A | 11/2013 |
| JP | 2020200943 A | 12/2020 |
| WO | WO 2017095994 A1 | 6/2017 |

\* cited by examiner

MULTI-VALVE

CROSS-REFERENCE TO PRIOR APPLICATION

Priority is claimed to German Patent Application No. DE 10 2021 110 106.9, filed on Apr. 21, 2021, the entire disclosure of which is hereby incorporated by reference herein.

FIELD

The invention relates to a multi-valve for a cooling system of a motor vehicle, having a valve housing, which has a plurality of inlets and a plurality of outlets and delimits a cylindrical valve chamber, wherein the inlets and the outlets open into the cylindrical valve chamber, and a valve unit, which is arranged inside the cylindrical valve chamber of the valve housing and can be rotated about an axis of rotation between a plurality of switching positions by means of an actuator, wherein, depending on the switching position of the valve unit, different inlets can be fluidically connected to different outlets.

BACKGROUND

Valves are used in different application regions in order to control a fluid flow of a fluid flow system. A motor vehicle has, for example, at least one cooling system which serves for cooling different components and thereby ensures the proper operation of the motor vehicle. An electric vehicle has a particularly large number of components to be cooled or to be heated, such as, for example, the traction battery, the traction motor and different components of a charging device for charging the traction battery. The different components are usually cooled or heated by means of a plurality of cooling/heating circuits, with the result that the complexity required for cooling is relatively high. Otherwise, the cooling or heating of the components is achieved by a single cooling/heating system or by just a few cooling/heating systems. It is necessary here for a large number of different valves to be used, with the result that the complexity and the costs of the cooling/heating system are relatively high.

In order to reduce the complexity caused by the plurality of different valves, a plurality of valves are combined to form a multi-valve, wherein the multi-valve performs the function of a plurality of individual valves. Such a multi-valve is disclosed, for example, by EP 3 384 187 A1, wherein a multi-valve is a constituent part of a cooling system of an electric vehicle. Different components of the electric vehicle are cooled by means of the cooling system. The multi-valve serves for controlling a cooling medium within the cooling system, wherein the multi-valve has five fluid connections, a valve chamber fluidically connected to the fluid connections, and a valve unit. The valve unit has two connection channels by means of which, depending on the switching position of the valve unit, different fluid connections can be fluidically connected to one another. The multi-valve is adjusted by means of an actuator, wherein the actuator rotates the multi-valve between different switching positions.

The disadvantage with such a multi-valve is that the number of fluid connections is relatively small and is limited to the small number of fluid connections by the construction of the multi-valve, with the result that a large number of further valves are required to control the fluid flow within the cooling system. It is possible here for just a few fluid connections to be simultaneously connected to one another.

SUMMARY

In an embodiment, the present invention provides a multi-valve for a cooling system of a motor vehicle, comprising: a valve housing, which has a plurality of inlets and a plurality of outlets and delimits a cylindrical valve chamber, the plurality of inlets and the plurality of outlets opening into the cylindrical valve chamber; and a valve unit, which is arranged inside the cylindrical valve chamber of the valve housing and is rotatable about an axis of rotation between a plurality of switching positions by an actuator, wherein, depending on a switching position of the valve unit, different inlets of the plurality of inlets are fluidically connectable to different outlets of the plurality of outlets, wherein the valve unit has a plurality of fluid channel structures which are offset from one another in a circumferential direction, and wherein each switching position of the plurality of switching positions is respectively assigned a fluid channel structure of the plurality of fluid channel structures.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1a shows a first embodiment of a multi-valve according to the invention,

DETAILED DESCRIPTION

In an embodiment, the present invention provides a simple multi-valve which can be produced cost-effectively and via which a large number of inlets can be connected to a large number of outlets according to requirements, with the result that the number of valves of the cooling system can be reduced.

The multi-valve according to the invention has a valve unit which has a plurality of fluid channel arrangements which are offset from one another in the circumferential direction and which are substantially fluidically separated from one another. Each fluid channel arrangement is assigned to a predefined switching position such that, in each switching position, the fluid flows through another associated fluid channel arrangement. As a result, a plurality of inlet-outlet combinations are provided in each switching position independently of other switching positions, wherein the inlet-outlet combinations are predefined by the fluid channel structure assigned to the switching position and by the configuration thereof.

Each fluid channel arrangement preferably has a plurality of tubular fluid connection elements which are arranged next to one another and which each have two open end faces. The open end faces can be fluidically connected to in each case an inlet and an outlet. By virtue of the fact that a plurality of fluid connection elements are provided, a plurality of inlets can be connected to in each case one outlet in each switching position by means of each fluid channel arrangement.

It is possible by means of such a configuration of the multi-valve for a large number of inlets to be connected to a large number of outlets according to requirements and in a simple manner, with the result that the number of valves of the cooling system can be reduced. Here, the multi-valve is configured to be very compact and has a small radial and axial installation space.

In a preferred embodiment, the inlets and the outlets are arranged in a row, that is to say next to one another in a single row. As a result, the radial installation space of the multi-valve can be reduced, wherein the outlets and the inlets are arranged exclusively in a circumferential portion and as a result the connection pieces or the connection lines adjoining the inlets and outlets are arranged exclusively in this circumferential portion.

In each case an inlet and an outlet are preferably arranged in alternating fashion. As a result, the fluid channel arrangements can be configured to be relatively simple in that two inlets directly adjoin an outlet, with the result that at least these two inlets can be connected to one another in a simple manner and without skipping other inlets or outlets.

In a preferred embodiment, the inlets and the outlets are arranged in a row, wherein the inlets are arranged in a first row and the outlets are arranged in a second row, wherein the first row is arranged offset from the second row in the circumferential direction. The fluid channel structures preferably have equidistant spacings from one another. What is to be understood by an equidistant spacing is that the valve unit always covers the same rotational angle during an adjustment of the valve unit between two switching positions. The arrangement of the inlets and of the outlets in two rows makes it possible to configure the multi-valve with such equidistant spacings, with the result that the adjustment of the valve unit between the switching positions and the actuation of the actuator are simplified. Even in the case of other embodiments of the multi-valve, it is possible in principle for the fluid channel structures to have equidistant spacings from one another. However, it can also be advantageous that the rotational angles between the switching positions are selected differently.

In a preferred embodiment, the inlets and the outlets are arranged in a plurality of rows, wherein at least one inlet and at least one outlet are arranged in a row. As a result, the multi-valve can be configured to be more compact.

The valve unit can preferably be fluidically connected to the inlets and the outlets over a single, cylindrical sealing plane. The valve chamber has a cylindrical inner circumferential surface, wherein the inlets and the outlets are provided on the cylindrical inner circumferential surface. The valve unit with its fluid channel arrangements also has a cylindrical shape at least in certain portions, wherein in particular the end faces of the fluid connection elements form the cylindrical shape of the valve unit. During the adjustment between the switching positions, that is to say during the rotation, of the valve unit, the valve unit slides along the cylindrical inner circumferential surface of the valve chamber. As a result, sealing between the valve unit and the valve housing can be simplified.

In a preferred embodiment, four inlets and three or four outlets are provided, wherein the valve unit is adjustable between seven switching positions. As a result, a large number of inlets can be fluidically connected to a large number of outlets according to requirements, wherein a plurality of fluidic connections between predefined inlets and predefined outlets can be produced in a switching position by the configuration of the different fluid channel structures.

The valve unit is preferably configured with a circular ring shape, wherein the outlets are arranged on an inner circumferential surface and the inlets are arranged on the outer circumferential surface, or the inlets are arranged on the inner circumferential surface and the outlets are arranged on the outer circumferential surface, wherein the fluid channel structures extend substantially radially. As a result, the axial installation space of the multi-valve can be reduced. In a preferred embodiment, four inlets and four outlets are provided, wherein the valve unit is adjustable between seven switching positions. As a result, a large number of inlets can be fluidically connected to a large number of outlets according to requirements.

In principle, the multi-valve can be configured with any desired number of inlets and outlets. Here, the valve unit is adjustable between a plurality of switching positions, wherein the number of switching positions depends on the selected number of inlets and outlets.

The fluid channel structures preferably have a circular, square or rectangular cross section. The fluid channel structures can also have a cross section of any other freehand form.

In a preferred embodiment, the actuator is surrounded radially by the valve unit, with the result that the actuator is arranged inside the valve unit and is integrated into the valve unit. As a result, the installation space of the multi-valve is reduced. The actuator is in particular an electrical actuator and has an electric motor and coupling members for coupling to the valve unit. Alternatively, the actuator is arranged separately and outside the valve unit, thereby making it easier to replace a defective actuator.

Two fluid channel structures preferably have a common fluid connection element, with the result that the installation space of the multi-valve can be reduced.

Two fluid channel structures are preferably fluidically connected to one another, wherein a fluid flow flows exclusively through the fluid channel structure set by the switching position and the other fluid channel structure is closed. As a result, the radial installation space of the valve unit can be reduced, wherein two fluid channel structures use a common portion to conduct the fluid. Here, for example, the end sides of the fluid connection elements of two adjacent fluid channel arrangements are configured as a common end side, wherein, in both switching positions of the two fluid channel structures, the common end side is fluidically connected to an inlet or outlet. In a switching position in which the fluid flows through one of the two fluid channel arrangements, the end side which is opposite to the common end side of the fluid connection elements is fluidically connected to an inlet or outlet. No fluid flows through the other fluid channel structure, since the end side opposite to the common end side bears against the continuous, cylindrical inner circumferential surface of the valve chamber, with the result that this end side is closed in a fluid-tight manner.

It is possible by means of such a configuration of the multi-valve for a large number of inlets to be connected to a large number of outlets according to requirements and in a simple manner, with the result that the number of valves of the cooling system can be reduced. Here, the multi-valve is configured to be very compact and has a small radial and axial installation space.

An exemplary embodiment of the invention is explained in more detail with reference to the drawings.

Figures 1A, 1D:
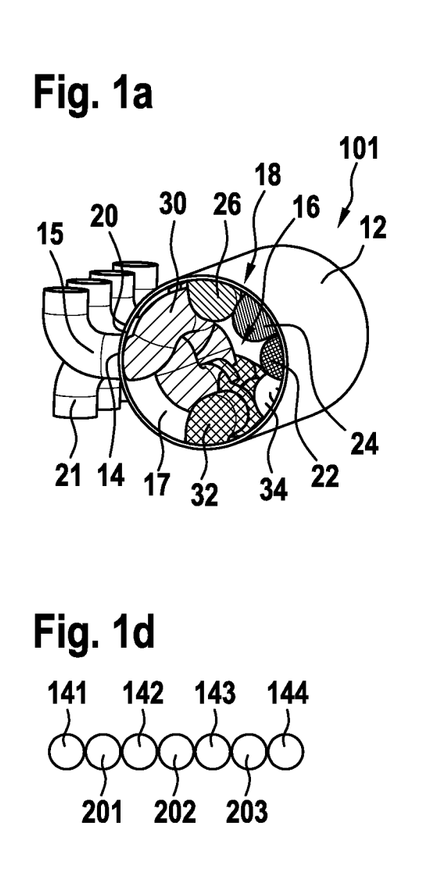
Figure 1B:
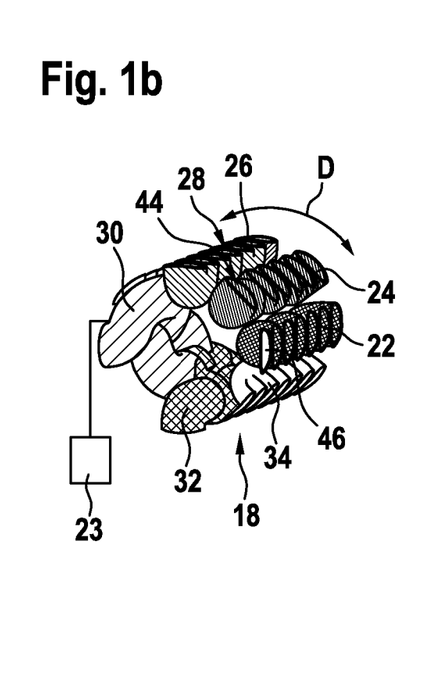
FIG. 1b shows a valve unit of the first embodiment of the multi-valve from FIG. 1a, FIG. 1c shows a channel matrix of the first embodiment of the multi-valve from FIG. 1a, FIG. 1d shows another view of the channel matrix of the first embodiment of the multi-valve from FIG. 1a, FIG. 2a shows a second embodiment of a multi-valve according to the invention.
Figure 1C:
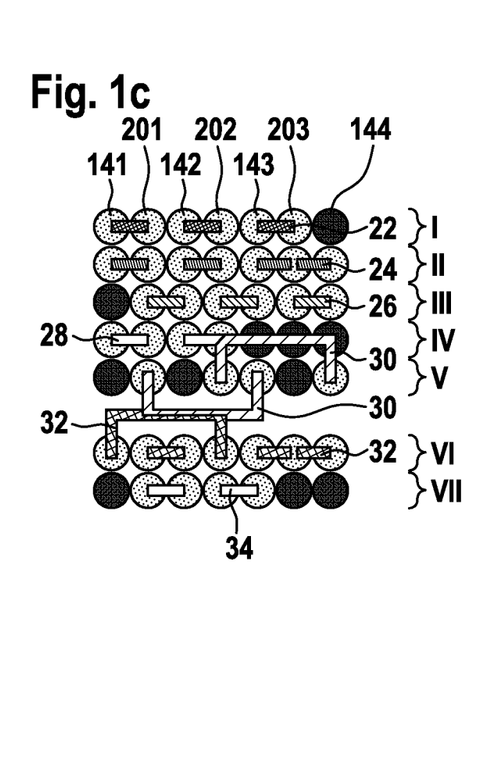

FIGS. 1a, 1b and 1c show a first embodiment of a multi-valve 101 according to the invention. The multi-valve 101 comprises a valve housing 12 which has an annular cross section, with the result that the valve housing 12 has an outer circumferential surface and an inner circumferential surface. The inner circumferential surface delimits a valve chamber 16 which, for example, is open axially on both sides. Alternatively, the valve chamber 16 can also be closed. Furthermore, the valve housing 12 comprises seven through-openings which extend from the inner circumferential surface to the outer circumferential surface.

The through-openings are arranged axially in a row and form a plurality of inlets 14 and a plurality of outlets 20. Here, the inlets 14 and the outlets 20 alternate, wherein a first inlet 141, then a first outlet 201 and then in turn a second inlet 142 are arranged on the edge. A second outlet 202, a third inlet 143, a third outlet 203 and a fourth inlet 144 are arranged in the same way.

On each inlet 14 and each outlet 20 there is in each case arranged a connection piece 15, 21, wherein the connection pieces 15, 21 are identical and configured as an angle tube. Alternatively, the connection pieces can also have another shape and be configured to be different from one another. A fluid line is in each case connected to the connection pieces 15, 21, wherein the angle tube-like connection pieces 15 assigned to the inlets 14 and the angle tube-like connection pieces 21 assigned to the outlets 20 are oriented in mutually opposite directions.

A valve unit 18 is arranged inside the valve chamber 16. The valve unit 18 has a plurality of fluid channel structures 22, 24, 26, 28, 30, 32, 34 which are arranged next to one another in the circumferential direction. The fluid channel structure 28 is concealed by the fluid channel structure 26 in the figures and is therefore not visible. The fluid channel structures 22, 24, 26, 28, 30, 32, 34 are connected to one another and together form the valve unit 18. Each fluid channel structure 22, 24, 26, 28, 30, 32, 34 has a plurality of fluid connection elements which are connected to one another in the axial direction. Each fluid connection element is, by way of example, of tubular configuration and has two open end faces, wherein the end faces face the inner circumferential surface of the valve housing 14 and bear against the inner circumferential surface of the valve housing 14, which forms the single sealing plane 17. Alternatively, the fluid connection elements can also have any desired cross-sectional shape, for example a rectangular shape. The fluid connection elements have the same or a mutually differing axial extent, wherein the axial extent of the fluid connection elements varies depending on which inlet 14 is intended to be connected to which outlet 20. Here, a first and a third fluid channel structure 22, 26 have in each case three fluid connection elements, wherein, depending on the switching position of the valve unit 18, in each case three inlets 14 can be fluidically connected to in each case one outlet 20 by the fluid channel structures 22, 24, 26, 32. A second and a sixth fluid channel structure 24, 32 have in each case four fluid connection elements, wherein, depending on the switching position of the valve unit 18, in each case two inlets 14 can be fluidically connected to in each case one outlet 20 and in each case two inlets 14 can be fluidically connected to a common outlet 20 by the fluid channel structures 24, 32. A fourth, fifth and seventh fluid channel structure 28, 30, 34 have in each case two fluid connection elements, wherein, depending on the switching position of the valve unit 18, in each case two inlets 14 can be fluidically connected to in each case one outlet 20 by the fluid channel structures 28, 30, 34.

The end sides of the fluid connection elements are configured in such a way that they bear in a fluid-tight manner against the inner circumferential surface of the valve housing 14. Here, fluid flows exclusively through the fluid connection elements when both end sides overlap with an inlet 14 or an outlet 20. In all other cases, the end sides are closed by the inner circumferential surface of the valve housing 14.

The fourth fluid channel structure 28 and the fifth fluid channel structure 30 are fluidically connected to one another. Here, in each case a fluid connection element of these two fluid channel structures 28, 30 shares a common portion, wherein this common portion serves to skip an inlet 14 fluid channel structure 30 set by the switching position. A further common portion is shared by the fluid connection element of the fifth fluid channel structure 30 and the fluid connection element of the sixth fluid channel structure 32, wherein the common portion serves to skip an inlet 14 and an outlet 20. The connection of two fluid channel structures is permissible here because a fluid flow flows exclusively through the fluid channel structure set by the switching position and the other fluid channel structure is closed.

Figure 5A:
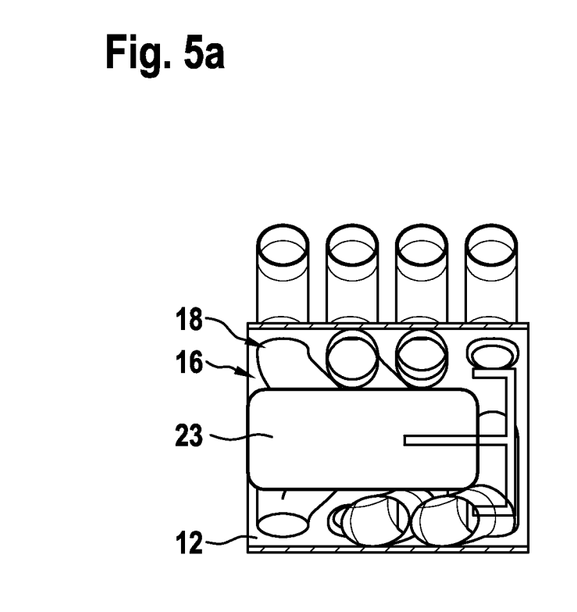
Figure 5B:
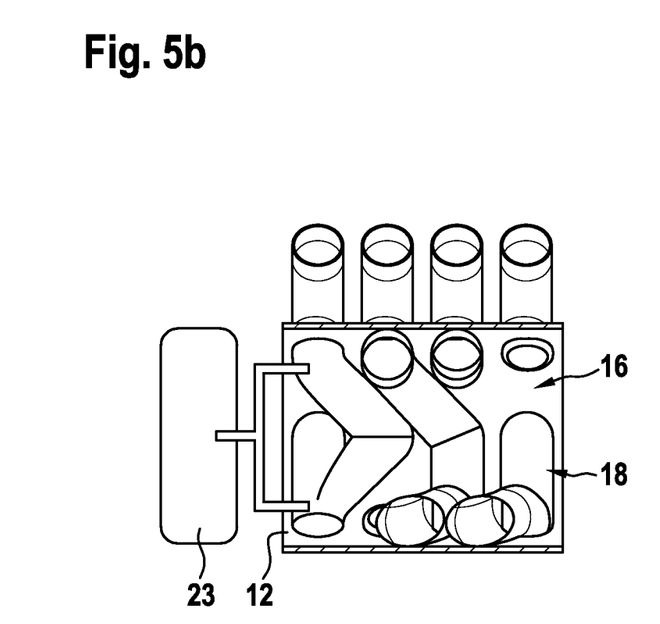
FIG. 5b shows a second arrangement of an actuator of the multi-valve.

The multi-valve 101 additionally has an actuator 23 which is schematically illustrated and is connected to the valve unit 18 in such a way that the valve unit 18 can be rotated in the direction of rotation D and about an axis of rotation between a plurality of switching positions. The actuator 23 can be arranged in the cavity radially between the fluid channel structures 22, 24, 26, 28, 30, 32, 34, that is to say be integrated into the valve unit 18, or can be arranged outside the valve unit 18. The two alternatives are illustrated in FIGS. 5a and 5b.

FIG. 1c shows a channel matrix of the first embodiment of the multi-valve 101, wherein it is illustrated by way of the channel matrix which inlets 14 are fluidically connected to which outlets 20 depending on the switching position of the valve unit 18. Here, the channel matrix and FIG. 1d show, horizontally, inlets and outlets 141, 142, 143, 144, 201, 202, 203 arranged next to one another and, vertically, the seven switching positions of the valve unit 18.

The number of switching positions corresponds to the number of fluid channel structures 22, 24, 26, 28, 30, 32, 34 within the valve unit 18. In each switching position, all fluidic connections are accordingly realized via a fluid channel structure 22, 24, 26, 28, 30, 32, 34 assigned to this switching position. Each fluid channel structure 22, 24, 26, 28, 30, 32, 34 consists of one or more fluid connection elements. The fluid channel structures 22, 24, 26, 28, 30, 32, 34 are designated with double-digit Arab numerals in the channel matrices representatively on one or more of their fluid connection elements. The fluid connection elements within a fluid channel structure 22, 24, 26, 28, 30, 32, 34 are filled in with the same pattern. The switching positions are designated in the channel matrices by means of curly brackets and Roman numerals. The first switching position relates to the designation with Roman 1 "I", the second switching position relates to the designation with Roman 2 "II", etc.

In the first switching position I, the first inlet 141 is fluidically connected to the first outlet 201, the second inlet 142 is fluidically connected to the second outlet 202 and the third inlet 143 is fluidically connected to the third outlet 203 via the first fluid channel structure 22. In the second switching position II, the first inlet 141 is fluidically connected to the first outlet 201, the second inlet 142 is fluidically connected to the second outlet 202, the third inlet 143 is fluidically connected to the third outlet 203 and the fourth inlet 144 is fluidically connected to the third outlet 203 via the second fluid channel structure 24. In the third switching position III, the second inlet 142 is fluidically connected to the first outlet 201, the third inlet 143 is fluidically connected to the second outlet 202 and the fourth inlet 144 is fluidically connected to the third outlet 203 via the third fluid channel structure 26. In the fourth switching position IV, the first inlet 141 is fluidically connected to the first outlet 201 and the second inlet 142 is fluidically connected to the second outlet 202 via the fourth fluid channel structure 28. In the fifth switching position V, the third inlet 143 is fluidically connected to the first outlet 201 and the fourth inlet 144 is fluidically connected to the second outlet 202 via the fifth fluid channel structure 30. In the sixth switching position VI, the first inlet 141 is fluidically connected to the second outlet 202, the second inlet 142 is fluidically connected to the first outlet 201, the third inlet 143 is fluidically connected to the third outlet 203 and the fourth inlet 144 is fluidically connected to the third outlet 203 via the sixth fluid channel structure 32. In the seventh switching position VII, the second inlet 142 is fluidically connected to the first outlet 201 and the second inlet 142 is fluidically connected to the third outlet 203 via the seventh fluid channel structure 34.

In all switching positions, the inlets 14 or outlets 20 which do not overlap with a fluid channel structure 22, 24, 26, 28, 30, 32, 34 are closed by a cover 46. The closed inlets 14 and outlets 20 are illustrated in a darkened manner in the channel matrix in FIG. 1c.

Figure 2A:
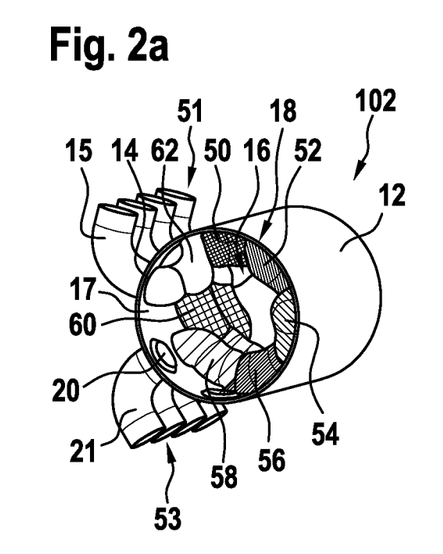
Figure 2B:
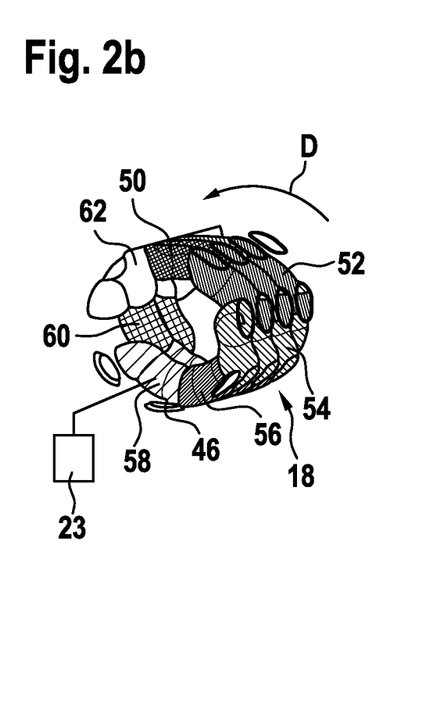
FIG. 2b shows a valve unit of the second embodiment of the multi-valve from FIG. 2a, FIG. 2c shows a channel matrix of the second embodiment of the multi-valve from FIG. 2a, FIG. 2d shows another view of the channel matrix of the second embodiment of the multi-valve from FIG. 2a, FIG. 3a shows a third embodiment of a multi-valve according to the invention.
Figure 2C:
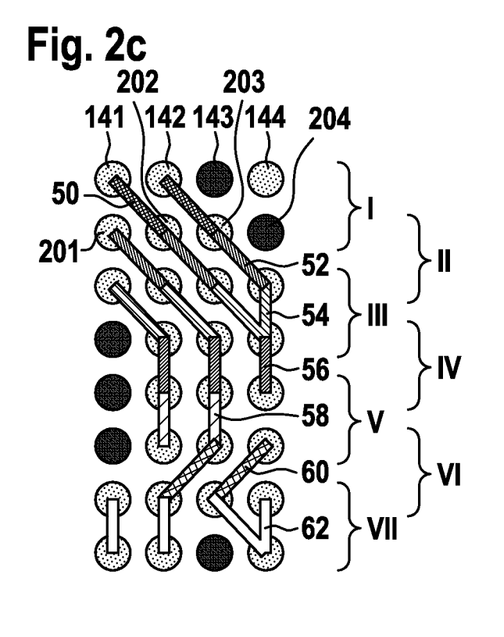

FIGS. 2a, 2b and 2c show a second embodiment of the multi-valve 102. The second embodiment of the multi-valve 102 comprises, as in the case of the first embodiment in FIG. 1, a valve housing 14 having an inner circumferential surface and an outer circumferential surface, a valve unit 18, which is arranged in a valve chamber 16, and an actuator 23, which is connected to the valve unit 18. The crucial differences of the second embodiment over the first embodiment in FIG. 1 are that the inlets 14 and the outlets 20 have a different arrangement and, correspondingly, the fluid channel structures 50, 52, 54, 56, 58, 60, 62 are configured differently. Here, the inlets 14 are arranged in a first row 51 extending in the axial direction, and the outlets 20 are arranged in a second row 53 extending in the axial direction. Furthermore, the second embodiment of the multi-valve 102 has four inlets 14 and four outlets 20.

Figure 2D:
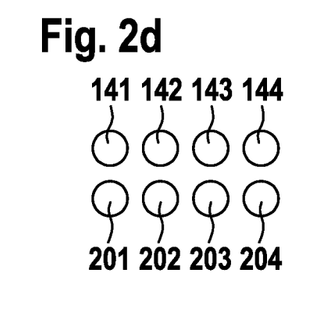

FIG. 2c shows a channel matrix of the second embodiment of the multi-valve 102, wherein it is illustrated by way of the channel matrix which inlets 14 are fluidically connected to which outlets 20 depending on the switching position of the valve unit 18. Here, the channel matrix and FIG. 2d show, horizontally, inlets 141, 142, 143, 144 arranged in a first row 51 and, horizontally, outlets 201, 202, 203, 204 arranged in a second row 53. In the first switching position I, the first inlet 141 is fluidically connected to the second outlet 202 and the second inlet 142 is fluidically connected to the third outlet 203 via the first fluid channel structure 50. In the second switching position II, the first inlet 141 is fluidically connected to the second outlet 202, the second inlet 142 is fluidically connected to the third outlet 203 and the third inlet 143 is fluidically connected to the fourth outlet 204 via the second fluid channel structure 52. In the third switching position III, the first inlet 141 is fluidically connected to the second outlet 202, the second inlet 142 is fluidically connected to the third outlet 203 and the third inlet 143 and the fourth inlet 144 are fluidically connected to the fourth outlet 204 via the third fluid channel structure 54. In the fourth switching position IV, the second inlet 142 is fluidically connected to the second outlet 202, the third inlet 143 is fluidically connected to the third outlet 203 and the fourth inlet 144 is fluidically connected to the fourth outlet 204 via the fourth fluid channel structure 56. In the fifth switching position V, the second inlet 142 is fluidically connected to the second outlet 202 and the third inlet 143 is fluidically connected to the third outlet 203 via the fifth fluid channel structure 58. In the sixth switching position VI, the third inlet 143 is fluidically connected to the second outlet 202 and the fourth inlet 144 is fluidically connected to the third outlet 203 via the sixth fluid channel structure 60. In the seventh switching position VII, the first inlet 141 is fluidically connected to the first outlet 201, the second inlet 142 is fluidically connected to the second outlet 202 and the third inlet 143 and the fourth inlet 144 are fluidically connected to the fourth outlet 204 via the seventh fluid channel structure 62.

Here, too, the inlets 14 and the outlets 20 which do not interact with one of the fluid channel structures 22, 24, 26, 28, 30, 32, 34 are closed by a cover 46 and illustrated in a darkened manner in FIG. 2c.

Figure 3A:
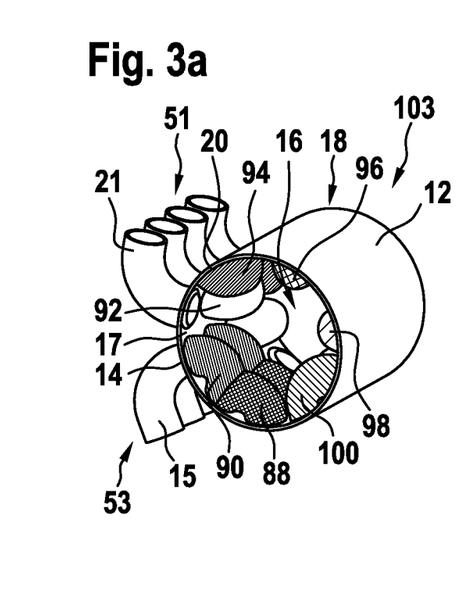
Figure 3B:
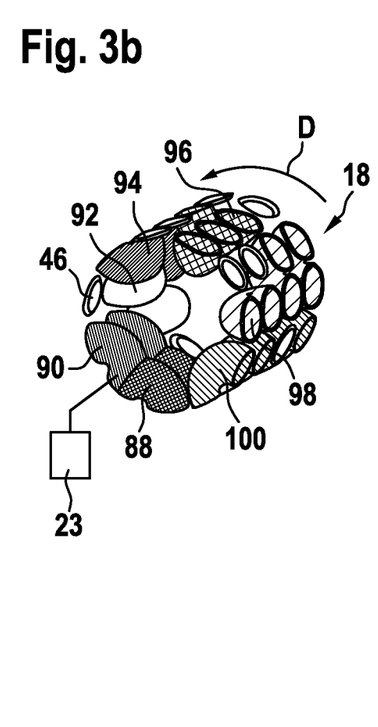
FIG. 3b shows a valve unit of the third embodiment of the multi-valve from FIG. 3a, FIG. 3c shows a channel matrix of the third embodiment of the multi-valve from FIG. 3a, FIG. 3d shows another view of the channel matrix of the third embodiment of the multi-valve from FIG. 3a, FIG. 4a shows a fourth embodiment of a multi-valve according to the invention.
Figure 3C:
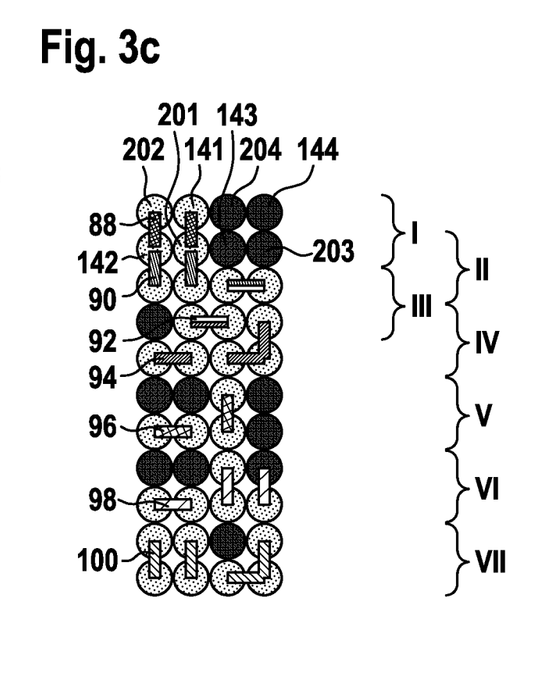

FIGS. 3a, 3b and 3c show a third embodiment of the multi-valve 103. The third embodiment of the multi-valve 103 substantially corresponds in construction to the second embodiment in FIG. 2a. The multi-valve comprises, as in the case of the second embodiment in FIG. 2, a valve housing 12 having an inner circumferential surface and an outer circumferential surface, a valve unit 18, which is arranged in a valve chamber 16, and an actuator 23, which is connected to the valve unit 18. The crucial differences of the third embodiment over the second embodiment in FIG. 2 are that inlets 14 arranged in two rows 51, 53 and the outlets 20 have a different arrangement and, correspondingly, the fluid channel structures 88, 90, 92, 94, 96, 98, 100 are configured differently. Here, the inlets 14 and the outlets 20 are arranged mixed in the two rows 51, 53, with the result that a plurality of inlets 14 and a plurality of outlets 20 are arranged in a first row 51 and a plurality of inlets and a plurality of outlets 20 are also arranged in a second row 53. Here, the inlets 14 and the outlets 20 are distributed among the two rows 51, 53 in such a way that all the fluid connection elements according to FIG. 3c have either a horizontal or a vertical course. This has the advantage that the valve unit 18 can be configured to be more compact.

Figure 3D:
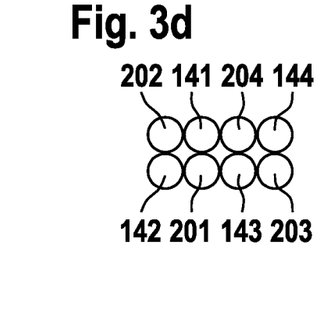

FIG. 3c shows a channel matrix of the third embodiment of the multi-valve 103, wherein it is illustrated by way of the channel matrix which inlets 14 are fluidically connected to which outlets 20 depending on the switching position of the valve unit 18. Here, the channel matrix and FIG. 3d show inlets 141, 144 and outlets 202, 204 arranged in the first row 51 and inlets 142, 143 and outlets 201, 203 arranged in the second row 53. In the first switching position I, the first inlet 141 is fluidically connected to the first outlet 201 and the second inlet 142 is fluidically connected to the second outlet 202 via the first fluid channel structure 88. In the second switching position II, the first inlet 141 is fluidically connected to the first outlet 201, the second inlet 142 is fluidically connected to the second outlet 202 and the third inlet 143 is fluidically connected to the third outlet 202 via the second fluid channel structure 90. In the third switching position III, the third inlet 143 is fluidically connected to the third outlet 203 and the fourth inlet 144 is fluidically connected to the fourth outlet 204 via the third fluid channel structure 92. In the fourth switching position IV, the first inlet 141 is fluidically connected to the fourth outlet 204, the second inlet 142 is fluidically connected to the first outlet 201, the third inlet 143 is fluidically connected to the third outlet 203 and the fourth inlet 144 is fluidically connected to the third outlet 203 via the fourth fluid channel structure 94. In the fifth switching position V, the second inlet 142 is fluidically connected to the first outlet 201 and the third inlet 143 is fluidically connected to the fourth outlet 204 via the fifth fluid channel structure 96. In the sixth switching position VI, the second inlet 142 is fluidically connected to the first outlet 201, the third inlet 143 is fluidically connected to the fourth outlet 204 and the fourth inlet 144 is fluidically connected to the third outlet 203 via the sixth fluid channel structure 98. In the seventh switching position VII, the first inlet 141 is fluidically connected to the first outlet 201, the second inlet 142 is fluidically connected to the second outlet 202, the third inlet 143 and the third outlet 203 are fluidically connected and the fourth inlet 144 is fluidically connected to the third outlet 203 via the seventh fluid channel structure 100.

It is shown in FIG. 3c that the two fluid channel structures 90, 92 share a common fluid connection element. In the fluid channel structure 90, this fluid connection element connects the third inlet 143 to the third outlet 203 in the second switching position II. In the fluid channel structure 92, the same fluid connection element connects the fourth inlet 144 to the fourth outlet 204 in the third switching position III. A further multiple use of a fluid connection element can be seen in the case of the fluid channel structures 92, 94, wherein the fluid connection element in the fluid channel structure 92 connects the third inlet 143 to the first outlet 201 in the third switching position III and in the fluid channel structure 94 connects the first inlet 141 to the fourth outlet 204 in the fourth switching position IV.

Figures 4A, 4D:
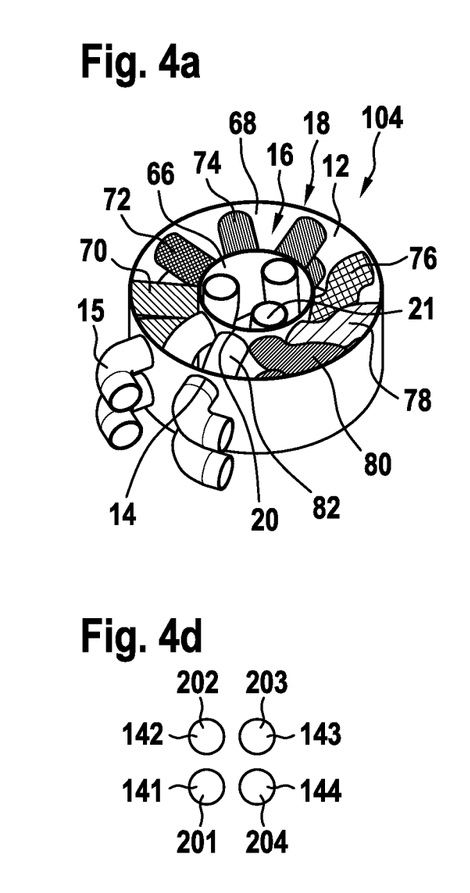
Figure 4B:
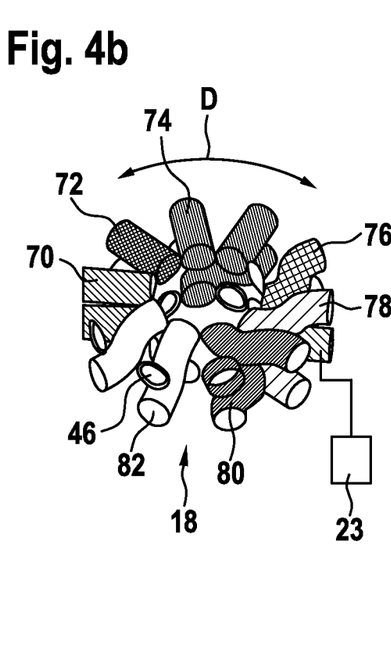
FIG. 4b shows a valve unit of the fourth embodiment of the multi-valve from FIG. 4a, FIG. 4c shows a channel matrix of the fourth embodiment of the multi-valve from FIG. 4a, FIG. 4d shows another view of the channel matrix of the fourth embodiment of the multi-valve from FIG. 4a, FIG. 5a shows a first arrangement of an actuator of the multi-valve.
Figure 4C:
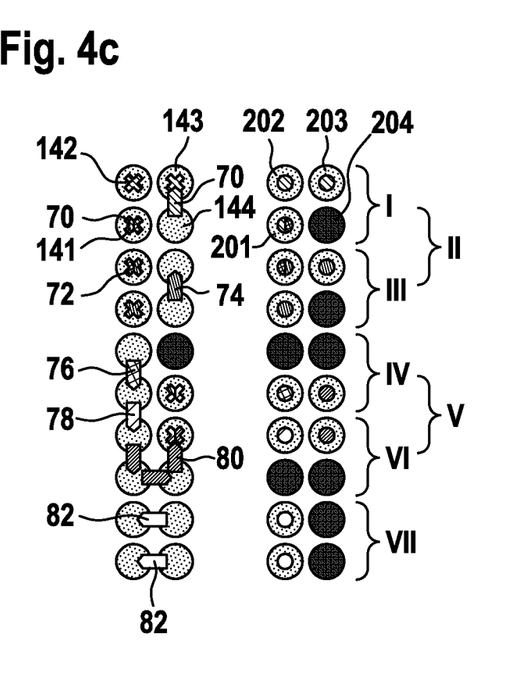

FIGS. 4a, 4b and 4c show a fourth embodiment of the multi-valve 104. The fourth embodiment of the multi-valve 104 comprises, as in the case of the first embodiment in FIG. 1a, the second embodiment in FIG. 2a and third embodiment 103 from FIG. 3a, a valve housing 14, a valve unit 18, which is arranged in a valve chamber 16, and an actuator 23, which is connected to the valve unit 18. By contrast with the two embodiments from FIGS. 1a and 2a, the valve housing 14 has an annular housing inner element 66 and a housing outer element 68, wherein the inner housing element 66 is surrounded radially by the outer housing element 68. An inner circumferential surface of the outer housing element 68 and the outer circumferential surface of the inner housing element 66 radially delimit the annular valve chamber 16 in which the valve unit 18 is arranged. The inlets 14 are provided on the outer housing element 68 and the outlets are provided on the inner housing element 66, with the result that the inlets 14 can be connected to the outlets 20 via the valve unit 16 with its substantially radially extending fluid channel structures 70, 72, 74, 76, 78, 80, 82.

FIG. 4c shows a channel matrix of the third embodiment of the multi-valve 104, wherein it is illustrated by way of the channel matrix which inlets 14 are fluidically connected to which outlets 20 depending on the switching position of the valve unit 18. The left two columns show the course of the fluid connection elements starting from the outer inlets 14. The right two columns show the outlet of the fluid connection elements in the respective switching position by way of the inner outlets 20.

The multi-valve 104 has four inlets 141, 142, 143, 144 and four outlets 201, 202, 203, 204, wherein in each case one inlet 141, 142, 143, 144 is arranged opposite in each case one outlet 201, 202, 203, 204. An X in FIG. 3c means that an inlet 14 is fluidically connected to an opposite outlet 20 by means of a rectilinearly configured fluid connection element. An arrow means that an inlet 14 is fluidically connected to an outlet 20 which is not arranged opposite in a straight line. In the first switching position I, the first inlet 141 is fluidically connected to the first outlet 201, the second inlet 142 is fluidically connected to the second outlet 202, the third inlet 143 is fluidically connected to the third outlet 203 and the fourth inlet 144 is fluidically connected to the third outlet 203 via the first fluid channel structure 70. In the second switching position II, the first inlet 141 is fluidically connected to the first outlet 201 and the second inlet 142 is fluidically connected to the second outlet 202 via the second fluid channel structure 72. In the third switching position III, the first inlet 141 is fluidically connected to the first outlet 201, the second inlet 142 is fluidically connected to the second outlet 202 and the third inlet 143 is fluidically connected to the fourth outlet 204 via the third fluid channel structure 74. In the fourth switching position IV, the second inlet 142 is fluidically connected to the first outlet 201 and the fourth inlet 144 is fluidically connected to the fourth outlet 204 via the fourth fluid channel structure 76. In the fifth switching position V, the second inlet 142 is fluidically connected to the first outlet 201, the third inlet 143 is fluidically connected to the third outlet 203 and the fourth inlet 144 is fluidically connected to the fourth outlet 204 via the fifth fluid channel structure 78. In the sixth switching position VI, the second inlet 142 is fluidically connected to the first outlet 201, the first inlet 141 is fluidically connected to the fourth outlet 204, the fourth inlet 144 is fluidically connected to the third outlet 203 and the third inlet 143 is fluidically connected to the third outlet 203 via the sixth fluid channel structure 80. In the seventh switching position VII, the third inlet 143 is fluidically connected to the second outlet 202 and the fourth inlet 144 is fluidically connected to the first outlet 201 via the seventh fluid channel structure 82.

Multiple uses of individual fluid connection elements of two fluid channel structures are also contained in this embodiment. The first multiple use relates to the fluid connection element which connects the first inlet 141 to the first outlet 201 within the fluid channel structure 70 in the first switching position I and connects the second inlet 142 to the second outlet 202 within the fluid channel structure 72 in the second switching position II. Analogously, in each case a fluid connection element is also used doubly between the switching positions II and III, IV and V, and also between V and VI.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A multi-valve for a cooling system of a motor vehicle, comprising:
    a valve housing, which has a plurality of inlets and a plurality of outlets and delimits a cylindrical valve chamber, the plurality of inlets and the plurality of outlets opening into the cylindrical valve chamber; and
    a valve unit, which is arranged inside the cylindrical valve chamber of the valve housing and is configured to be controllably rotated about an axis of rotation between a plurality of switching positions by an actuator such that different inlets of the plurality of inlets are fluidically connectable to different outlets of the plurality of outlets based on a selected switching position of the plurality of switching positions,
    wherein the valve unit has a plurality of fluid channel structures which are offset from one another in a circumferential direction, and
    wherein each switching position of the plurality of switching positions is respectively assigned a fluid channel structure of the plurality of fluid channel structures.

2. The multi-valve of claim 1, wherein the plurality of inlets and the plurality of outlets are arranged in a row.

3. The multi-valve of claim 2, wherein in each case an inlet of the plurality of inlets and an outlet of the plurality of outlets are arranged in alternating fashion.

4. The multi-valve of claim 2, wherein the valve unit is fluidically connectable to inlets of the plurality of inlets and outlets of the plurality of outlets over a single, cylindrical sealing plane.

5. The multi-valve of claim 1, wherein inlets of the plurality of inlets and outlets of the plurality of outlets are arranged in a row,
    wherein the inlets are arranged in a first row and the outlets are arranged in a second row, and
    wherein the first row is arranged offset from the second row in the circumferential direction.

6. The multi-valve of claim 5, wherein fluid channel structures of the plurality of fluid channel structures have equidistant spacings from one another such that, when adjusting between two switching positions, the valve unit is always rotated by a same adjustment angle.

7. The multi-valve of claim 1, wherein inlets of the plurality of inlets and outlets of the plurality of outlets are arranged in a plurality of rows, and
    wherein at least one inlet of the plurality of inlets and at least one outlet of the plurality of outlets are arranged in a row.

8. The multi-valve of claim 1, wherein the valve unit is configured with a circular ring shape,
    wherein outlets of the plurality of outlets are arranged on an inner circumferential surface and inlets of the plurality of inlets are arranged on an outer circumferential surface, or inlets of the plurality of inlets are arranged on the inner circumferential surface and the outlets are arranged on the outer circumferential surface, and
    wherein fluid channel structures of the plurality of fluid channel structures extend substantially radially.

9. The multi-valve of claim 1, wherein fluid channel structures of the plurality of fluid channel structures have a circular, square, or rectangular cross section or a cross section of any other freehand form.

10. The multi-valve of claim 1, wherein the actuator is surrounded radially by the valve unit.

11. The multi-valve of claim 1, wherein each fluid channel structure of the plurality of fluid channel structures has a plurality of individual fluid connection elements, and
    wherein in each case one inlet of the plurality of inlets is connectable to in each case one outlet via in each case one fluid connection element of the plurality of individual fluid connection elements.

12. The multi-valve of claim 11, wherein two fluid channel structures of the plurality of fluid channel structures have a common fluid connection element of the plurality of individual fluid connection elements.

13. The multi-valve of claim 1, wherein two fluid channel structures of the plurality of fluid channel structures are fluidically connected to one another, and
    wherein a fluid flow flows exclusively through a first fluid channel structure of the two fluid channel structures set by a switching position of the plurality of switching positions and the second fluid channel structure of the two fluid channel structures is closed.

14. A multi-valve for a cooling system of a motor vehicle, comprising:
    a valve housing, which has a plurality of inlets and a plurality of outlets and delimits a cylindrical valve chamber, the plurality of inlets and the plurality of outlets opening into the cylindrical valve chamber; and
    a valve unit, which is arranged inside the cylindrical valve chamber of the valve housing and is rotatable about an axis of rotation between a plurality of switching positions by an actuator,
    wherein, depending on a switching position of the valve unit, different inlets of the plurality of inlets are fluidically connectable to different outlets of the plurality of outlets, wherein the valve unit has a plurality of fluid channel structures which are offset from one another in a circumferential direction, and wherein each switching position of the plurality of switching positions is respectively assigned a fluid channel structure of the plurality of fluid channel structures, wherein each fluid channel structure of the plurality of fluid channel structures results in a unique configuration, with respect to any other fluid channel structure, of specific inlets of the plurality of inlets being fluidically connectable to specific outlets of the plurality of outlets.

15. The multi-valve of claim 1, wherein a first fluid channel structure assigned to a first switching position of the plurality of switching positions comprises at least a portion of a second fluid channel structure assigned to a second switching position of the plurality of switching positions.

16. The multi-valve of claim 1, wherein over a set of switching positions of the plurality of switching positions, each inlet of the plurality of inlets is fluidically connectable to every outlet of the plurality of outlets.

17. The multi-valve of claim 1, wherein the plurality of switching positions comprises a first switching position and a second switching position, and wherein the valve unit is further configured such that:

in the first switching position, the first fluid channel structure is applied to the plurality of inlets and the plurality of outlets; and in the second switching position, the second fluid channel structure is applied to the plurality of inlets and the plurality of outlets.

18. A multi-valve for a cooling system of a motor vehicle, comprising:

a valve housing, which has a plurality of inlets and a plurality of outlets and delimits a cylindrical valve chamber, the plurality of inlets and the plurality of outlets opening into the cylindrical valve chamber; and a valve unit, which is arranged inside the cylindrical valve chamber of the valve housing and is rotatable about an axis of rotation between a plurality of switching positions by an actuator, wherein the plurality of inlets comprise a first inlet and a second inlet, and the plurality of outlets comprises a first outlet and a second outlet, wherein the valve unit comprises a plurality of fluid channel structures which are offset from one another in a circumferential direction and which are each configured to fluidically connect an inlet of the plurality of inlets to an outlet of the plurality of outlets, the plurality of fluid channel structures comprising a first fluid channel structure configured such that the first inlet is fluidically connectable to the first outlet, and a second fluid channel structure configured such that the first inlet is fluidically connectable to the second outlet or the second inlet is fluidically connectable to the first outlet, and wherein each switching position of the plurality of switching positions is configured to apply a different fluid channel structure of the plurality of fluid channel structures to the plurality of inlets and the plurality of outlets.

* * * * *